(12) United States Patent
Koethe (10) Patent No.: US 6,360,730 B1
(45) Date of Patent: Mar. 26, 2002

(54) INERT LOADING JET FUEL

(75) Inventor: Terence Lee Koethe, Keller, TX (US)

(73) Assignee: Fuel Dynamics, Arlington, TX (US)

( * ) Notice: Subject to any disclaimer, the term of this patent is extended or adjusted under 35 U.S.C. 154(b) by 0 days.

(21) Appl. No.: 09/586,132

(22) Filed: Jun. 2, 2000

Related U.S. Application Data (63) Continuation-in-part of application No. 08/860,157, filed as application No. PCT/US97/04091 on Mar. 17, 1997, now Pat. No. 6,024,074, which is a continuation-in-part of application No. 08/708,638, filed on Sep. 5, 1996.
(60) Provisional application No. 60/067,745, filed on Dec. 5, 1997, and provisional application No. 60/013,636, filed on Mar. 18, 1996.

(51) Int. Cl.[7] .............................................. B01D 19/00
(52) U.S. Cl. ...................................................... 123/541
(58) Field of Search ......................................... 123/541

(56) References Cited

U.S. PATENT DOCUMENTS

| | | | |
|---|---|---|---|
| 1,533,309 A | 4/1925 | Durborow | |
| 2,483,045 A | 9/1949 | Harby | |
| 2,711,842 A | 6/1955 | Jonas | 220/88 |
| 2,731,239 A | 1/1956 | Anderson | |
| 2,740,604 A | 4/1956 | Swigart et al. | 251/61 |
| 2,889,955 A | 6/1959 | Naulty et al. | 220/88 |
| 3,229,446 A * | 1/1966 | Sebastian et al. | 95/265 |
| 3,390,528 A | 7/1968 | Howell et al. | |
| 3,590,559 A * | 7/1971 | Bragg | 96/164 |
| 3,628,758 A | 12/1971 | Nichols | 244/135 |
| 3,691,730 A * | 9/1972 | Hickey et al. | 96/161 |
| 3,693,915 A | 9/1972 | Ulanovsky | 244/135 |
| 3,710,549 A | 1/1973 | Nichols et al. | 55/160 |
| 3,732,668 A | 5/1973 | Nichols | 55/160 |
| 3,779,007 A | 12/1973 | Lavash | |
| 3,788,039 A | 1/1974 | Bragg | 55/160 |
| 3,788,040 A * | 1/1974 | Bragg et al. | 96/164 |
| 3,797,263 A * | 3/1974 | Shahir et al. | 62/50.1 |
| 3,874,168 A | 4/1975 | Toure | |
| 3,948,626 A * | 4/1976 | Bragg | 96/158 |
| 4,011,734 A | 3/1977 | Jones | 62/132 |
| 4,155,337 A | 5/1979 | Hensley | |

(List continued on next page.)

FOREIGN PATENT DOCUMENTS

| | | |
|---|---|---|
| DE | 3214874 | 11/1983 |
| GB | 687872 | 2/1953 |

OTHER PUBLICATIONS

Edwards Engineering Corp. Brochure, Form #94001–A, Dated Sep. 1, 1996*.

*Primary Examiner*—Marguerite McMahon
(74) *Attorney, Agent, or Firm*—Mark W. Handley; Chauza & Handley LLP (57) ABSTRACT

Inert loading jet fuel (302) is a provided by directly injecting an inerting agent (316) directly into jet fuel (308) while it is being loaded onboard an aircraft (13) to ultimately make aircraft fuel tanks (17) safe from ignition and explosions. The inerting agent (316) is preferably gaseous nitrogen ($N_2$) which is directly injected into the fuel flow (346) during refueling of the aircraft (13), and travels to the fuel tanks (17) and then separates from the fuel (302) within the fuel tank (17) to substantially fill the ullage of the fuel tank (17) with a non-explosive atmosphere. The inerting agent (316) may also be injected in to aircraft fuels (8) which are cooled to reduced temperatures such that the volume of the fuel (8) is reduced, thereby allowing more fuel (8) to be held in the storage (17). The inerting agent may further be injected into aircraft fuels which are heated and then stored in fuel storage (17) of the aircraft (13) to de-ice the wings (15) of the aircraft (13). Such fuels are heated externally of the aircraft (13) to elevated temperatures which are sufficiently high enough to transfer heat from the fuel, through a fuel tank (17) extending within the wings (15), and to the exterior of the wings (15) to de-ice the aircraft (13).

13 Claims, 8 Drawing Sheets

U.S. PATENT DOCUMENTS

| | | |
|---|---|---|
| 4,304,271 A | 12/1981 | Mowatt-Larssen ............ 141/35 |
| 4,378,920 A | 4/1983 | Runnels et al. ............. 244/135 |
| 4,406,129 A | 9/1983 | Mills |
| 4,505,124 A | 3/1985 | Mayer |
| 4,683,921 A | 8/1987 | Neeser |
| 4,938,036 A | 7/1990 | Hodgkind et al. |
| 5,121,609 A | 6/1992 | Cieslukowski |
| 5,127,230 A | 7/1992 | Neeser et al. |
| 5,156,134 A | 10/1992 | Tochizawa |
| 5,163,409 A | 11/1992 | Gustafson et al. |
| 5,174,354 A | 12/1992 | Neeser et al. |
| 5,176,002 A | 1/1993 | O'Brien et al. ............. 62/48.2 |
| 5,228,295 A | 7/1993 | Gustafson |
| 5,228,585 A | 7/1993 | Lutgen et al. |
| 5,231,838 A | 8/1993 | Cieslukowski |
| 5,234,035 A | 8/1993 | Neeser |
| 5,251,603 A | 10/1993 | Watanabe et al. |
| 5,325,894 A | 7/1994 | Kooy et al. |
| 5,360,139 A | 11/1994 | Goode |
| 5,365,981 A | 11/1994 | Peschka et al. |
| 5,368,003 A | 11/1994 | Clemente |
| 5,373,702 A | 12/1994 | Kalet et al. |
| 5,375,582 A | 12/1994 | Wimer |
| 5,404,918 A | 4/1995 | Gustafson |
| 5,421,160 A | 6/1995 | Gustafson et al. |
| 5,421,161 A | 6/1995 | Gustafson |
| 5,421,162 A | 6/1995 | Gustafson et al. |
| 5,465,583 A | 11/1995 | Goode |
| 5,479,959 A | 1/1996 | Stotelmyer et al. ......... 137/559 |
| 5,537,824 A | 7/1996 | Gustafson et al. |
| 5,558,303 A | 9/1996 | Koethe et al. |
| 5,562,130 A | 10/1996 | Peha et al. .................... 141/98 |
| 5,582,366 A | 12/1996 | Hamant et al. ............. 244/135 |
| 5,590,535 A | 1/1997 | Rhoades |
| 5,601,066 A | 2/1997 | Qutub |
| 5,616,838 A | 4/1997 | Preston et al. |
| 5,641,005 A | 6/1997 | Kountz et al. |
| 5,651,473 A | 7/1997 | Preston et al. |
| 5,746,397 A | 5/1998 | DeField et al. ............. 244/135 |
| 5,832,903 A | 11/1998 | White et al. |
| 6,024,074 A | 2/2000 | Koethe ....................... 123/541 |
| 6,182,714 B1 * | 2/2001 | Ginsburgh et al. ............ 141/63 |

* cited by examiner

INERT LOADING JET FUEL

CROSS REFERENCE TO RELATED APPLICATIONS

The present application is a Continuation-in-Part of U.S. Provisional Patent Application Ser. No. 60/067,745, filed on Dec. 5, 1997 and entitled "INERT LOADING JET FUEL;" and the present application is also a Continuation-in-Part of U.S. application Ser. No. 08/860,157, filed on Jun. 17, 1997 now U.S. Pat. No. 6,024,074, which is a National Phase Application of PCT International Patent Application Serial Number PCT/US97/04091, filed on Mar. 17, 1997, which is a Continuation-in-Part of U.S. patent application Ser. No. 08/708,638 filed on Sep. 5, 1996, which is a Continuation-in-Part of U.S. provisional patent application Ser. No. 60/013,636, filed on Mar. 18, 1996, which are entitled "REFRIGERATED FUEL FOR ENGINES" and invented by Terence Lee Koethe; and the present application is further related to U.S. Pat. No. 5,558,303, entitled "METHOD AND APPARATUS FOR USING HOT FUELS TO DE-ICE AIRCRAFT," invented by Terence L. Koethe et al., and issued on Sep. 24, 1996.

TECHNICAL FIELD OF THE INVENTION

The present invention relates to treating fuel for use in aircraft and other vehicles, such that the fuel is self inerting.

BACKGROUND OF THE INVENTION

Conventional fuel tanks for aircraft have ullages which contain explosive mixtures of atmospheric air and fuel vapors during various stages of operation of the aircraft. The fuel tanks are vented to atmosphere to relieve ascent and descent pressure changes, allowing the atmospheric air to enter into the ullages and mix with the fuel vapors above the liquid levels of the volatile fuels contained within the fuel tanks. These explosive mixtures are highly flammable and are easily ignited by a spark or other ignition source, which can result in massive explosions and loss of life to those onboard the aircraft.

The risks due to explosives mixtures being contained within fuel tank ullages may be increased as ambient temperatures increase, raising the temperature of the volatile fuels contained within the aircraft. Fuel temperatures may also be increased due to various processes, such as those employed for deicing the aircraft. U.S. Pat. No. 5,558,303, entitled "Method And Apparatus For Using Hot Fuels To De-Ice Aircraft," invented by Koethe, et al., and issued on Sep. 24, 1996 discloses a method whereby hot fuels are used to de-ice aircraft. The hot fuels are provided in aircraft fuel tanks, and then heat is transferred from the hot fuels to exterior surfaces of the aircraft to warm and thus de-ice the exterior surfaces. This hot fuel de-icing technique has proven effective for both removing and preventing in-flight icing, icing on the ground in cold and warm weather, as well as moisture condensation within fuel tanks. Use of hot fuels to de-ice aircraft may provide a more environmentally friendly and often times more effective technique than the currently employed commercial method of spraying warm antifreeze fluids onto the exterior surfaces of the aircraft. However, the use of hot fuels for de-icing aircraft is subject to safety requirements, which later may prevent the use of raised temperature fuels if such use is later found to create increased safety concerns regarding explosive mixtures in fuel tank ullages.

Previous attempts have been made to reduce the risks of explosion within the non-vented ullages of aircraft fuel tanks. One such attempt fills the ullages with an inert gas, such as nitrogen ($N_2$), to blanket the liquid fuel and prevent air from entering the ullages so that the fuel vapors in the ullages will not have a readily available oxygen source. The inert gases were provided by on-board tanks or generating systems which proved inefficient and ultimately impractical due to the size of large, heavy tanks used for on-board storage or generating of the inerting gases, and the heavy logistics support required for such systems. This type of system also required alteration of existing aircraft to accommodate such equipment.

A second problem exists is that the range of aircraft, or the distance which the aircraft can fly, is limited due to the limited volumetric storage capacity of onboard fuel tanks. While in-flight refueling is possible today with some types of aircraft, most refueling is performed on the ground. Such refueling stops prolong travel time and ruin the economics of operating an airplane. It is therefore desirable to increase the amount of fuel that can be stored on the aircraft, preferably with no or only minimal alteration to the aircraft structure. On such method is that set forth in PCT International Patent Application Serial Number PCT/US97/04091, filed on Mar. 17, 1997, entitled "REFRIGERATED FUEL FOR ENGINES," invented by Terence Lee Koethe, published on Oct. 9, 1997 and claiming a priority date of Mar. 18, 1996, as set forth above in the section entitled "Cross Reference To Related Applications," and to which the present application claims priority as a Continuation-in-Part.

SUMMARY OF THE INVENTION

A method and apparatus are disclosed for providing inert loading jet fuel for use in cold fuel, hot fuel or conventional temperature fuel applications for aircraft. Inert loading jet fuel is preferably provided by direct contact injection, in which an inerting material, such as, for example, nitrogen ("$N_2$"), is directly into the jet fuel as the fuel is being loaded aboard the aircraft. The inerting material is preferably injected directly into the jet fuel by injection nozzles which are in direct contact with a flow of the jet fuel. The inert material is metered to accommodate an entrained level of the inerting material which will outgas as an inert gas into a ullage of an onboard, vented fuel tank of the aircraft, rendering the mixture of gases in the ullage nonexplosive for a period of time.

The inerting material can be injected into fuels which are used to provide cold temperature fuels, which are cooled to temperatures that are less than ambient temperatures so that the unit volume of the fuel per pound of fuel is reduced. The fuel is preferably cooled externally to the aircraft at a ground location, and then stored in onboard fuel tanks at the reduced temperatures, allowing more fuel to be held in the storage tanks and increasing the energy value of the fuel per unit volume over fuel at ambient temperatures. A heat transfer surface may also cooled below ambient temperature using the cold fuel or the inerting material, and then ambient air is passed over the heat transfer surface and cooled for passing into the passenger compartment of the aircraft.

The inerting material may also be injected into fuels which are used to provide hot fuel for de-icing aircraft. The hot fuel is provided by heating fuel to elevated temperatures which are sufficiently high enough to transfer heat from the fuel stored in onboard fuel tanks within the wings of the aircraft to the exterior of the wings to de-ice the aircraft. The inerting material may be injected directly into the fuel either prior to or after heating to the elevated temperatures.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
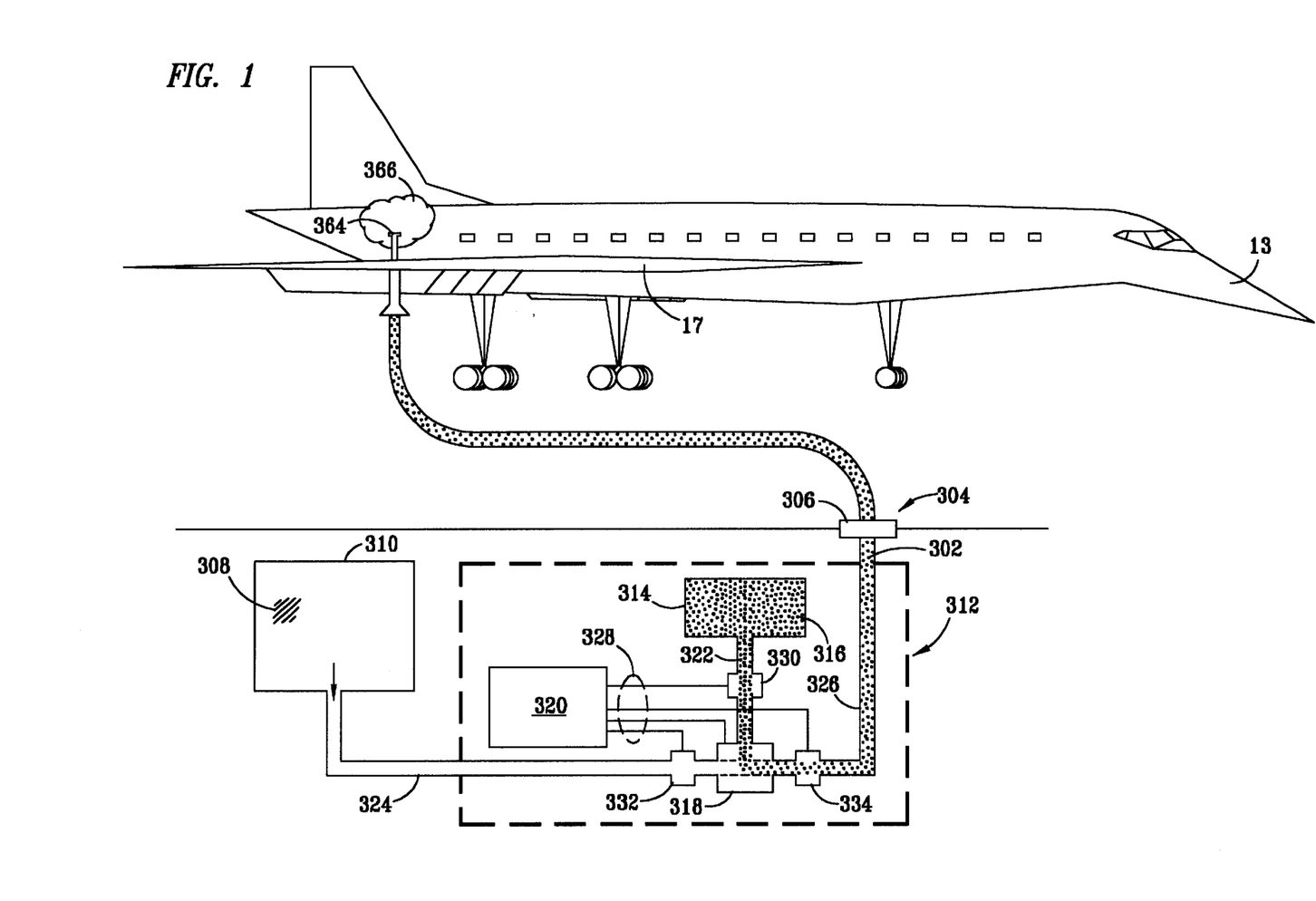
FIG. 1 is a schematic diagram of a fixed, ground based, aircraft refueling station having an inert material injection unit for providing inert loading fuel from an underground hydrant system.

FIG. 1 depicts an aircraft 13 being refueled with an inert loading jet fuel 302 provided by an inert loading jet fuel system 304. The inert loading jet fuel system 304 is preferably a ground based hydrant system, as shown, but in other embodiments a portion or all of the system 304 may be truck, trailer or skid mounted. A fuel hydrant 306 is preferably located in a fuel containment pit. A fuel supply is provided by fuel 308 which is stored in a fuel tank 310. The inert loading jet fuel 302 and the fuel 308 for processing into inert loading jet fuel 302 are preferably fuel of the type specified by American Petroleum Institute ("API") standards to be: Jet A, Jet B, Jet B-1; or preferably U.S. Military ("Mil") specifications to be: JP-1, JP-2, JP-3, JP-4, JP-5, JP-6, JP-7, JP-8. The fuel 308 is supplied to an inerting unit 312. The inerting unit 312 includes a container 314 of inerting agent 316, which is supplied by an inerting material which will later outgas from the fuel to displace any ambient air located in the ullage of the fuel storage 17 aboard the aircraft 13. The inerting agent 316 is preferably nitrogen, in either liquid or gaseous form. Other inert materials may be used as an inerting agent, such as materials which will be carried but not go into solution with the fuel and outgas into the ullage of onboard fuel storage tanks as an inert gas over a period of time. The inerting unit 312 further includes a mixing unit 318 and a control unit 320. The mixing unit 318 is connected to the container 314 by the flow line 322, to the fuel tank 310 by the flow line 324 and to the hydrant 306 by the flow line 326. The control unit 320 is preferably a data processing system, which is connected to the mixing unit 318 by data and control signal lines 328. The signal lines 328 also connect to sensor units 330, 332 and 334, which detect the flow rate, temperature, and specific gravity parameters of the flow passing through the flow lines 322, 324 and 326.

Figure 2:
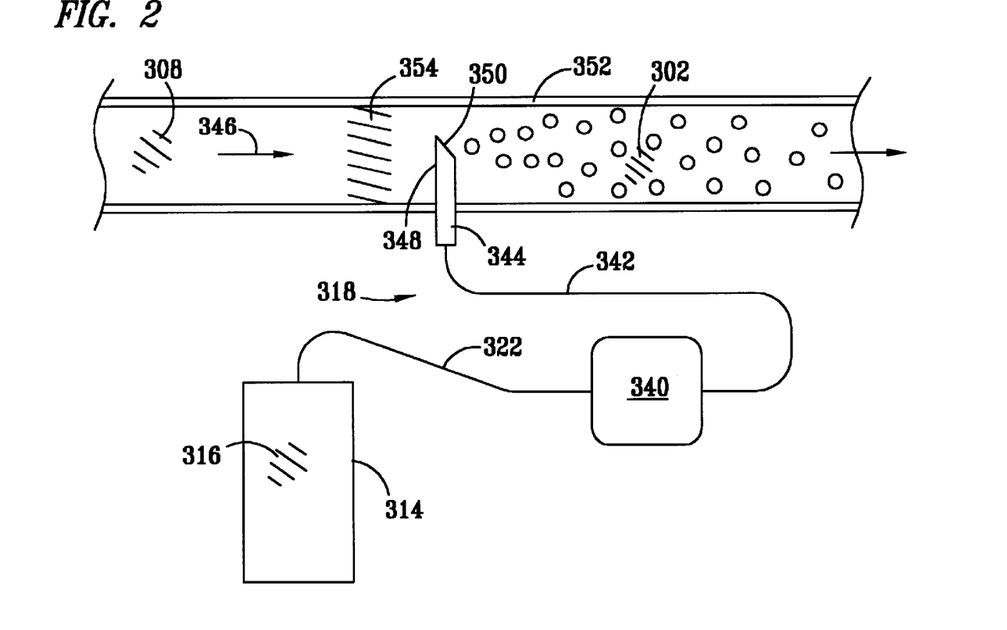
FIG. 2 is a schematic diagram of an injector for injecting an inerting material into a central portion of a flow of fuel.

FIG. 2 is a schematic diagram of the container 314 of the inerting agent 316 and the mixing unit 318. The mixing unit 318 has a flow control valve 340, which is preferably controlled by the control unit 320 (shown in FIG. 1). The valve 340 controls the flow of inerting agent through the flow lines 322 and 342, and through an injector 344 into a flow 346 of the fuel 308. One or more of the injectors 344 are provided, preferably by an injection tube 348 having an outlet 350 which extends into a central portion of a mixing section of fuel flow line 352. A plurality of agitator baffles 354 are disposed in a mixing section of the flow line 352, preferably upstream of the injector outlet 350, to enhance mixing of the inerting agent 316 into the fuel 308. The injection outlet 350 preferably faces at a forty-five degree angle to the direction of the flow 346.

Figure 3:
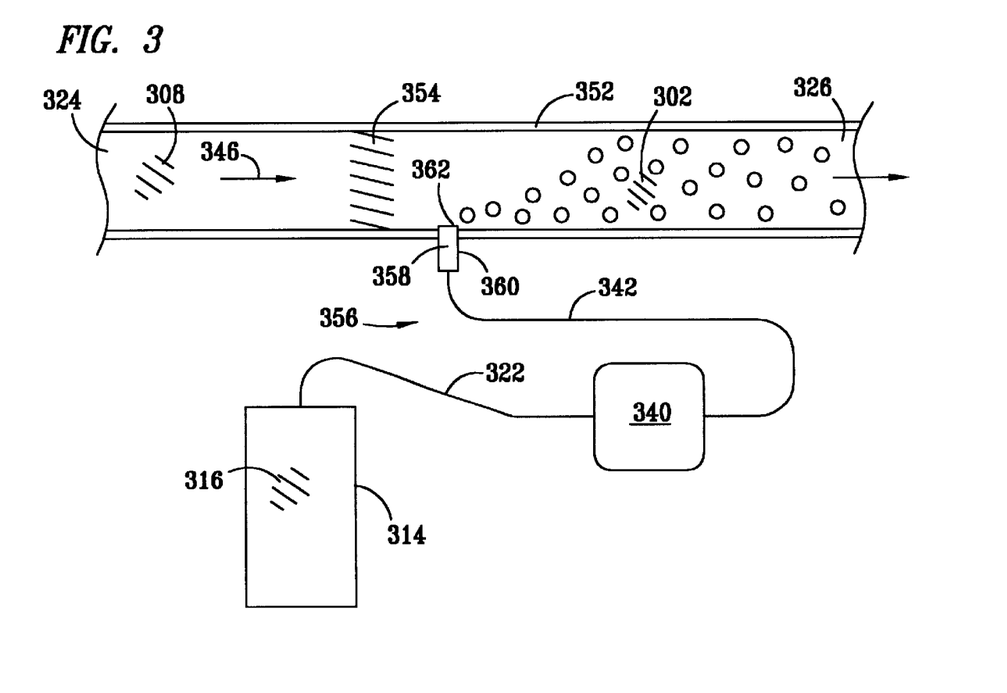
FIG. 3 is a schematic diagram of an injector for injecting an inerting material into the side of a flow of fuel.

FIG. 3 is a schematic diagram of the container 314 of the inerting agent 316 and an alternative mixing unit 356. Similar to the mixing unit 316, the mixing unit has the flow control valve 340, which is preferably controlled by the control unit 320 (shown in FIG. 1), and which controls flow of the inerting agent through the flow lines 322 and 342 to an injector 358. One or more of the injectors 358 are provided, preferably with a tubular body 360, which provides a flow passage therethrough, and an outlet 362. The outlet 362 is preferably substantially flush with the side of the mixing section of the flow line 352, and faces perpendicular to the direction of the flow 346 for less flow restriction. The agitator 354 is preferably located upstream from the injector 358. In yet other embodiments, a manifold may be provided by a porous material in one or more injection tubes, such as the tubes 344 and 346, to disperse the inerting agent 316 evenly throughout the fuel 302.

In operation, the fuel 308 from the storage tank 310 is passed through the mixer 318 and the inerting agent 316 is injected into the fuel flow 346 to provide inert loading jet fuel 302. The inerting agent 316 is preferably nitrogen ($N_2$), such that the inert loading fuel 302 is fuel 308 which has been nitrogenated. The nitrogenated fuel then passes through the hydrant 306 and into the fuel storage 17 aboard the aircraft 13. The inerting agent 314 is suspended within the fuel flow 346 and outgases into the ullage of the fuel storage 17 in less than ten minutes, and then vents as gas 366 through fuel storage vents 364 over a period of three hours or more. Directing an inerting agent 316, such as nitrogen ($N_2$) into the fuel 308 will temporarily energize the fuel 308 with the inerting agent 316 to provide inert loading fuel 302. Since the fuel 302 is under pumping pressure while being loaded on the aircraft 13, it will suspend the inerting agent 316 therein, and carry the inerting agent 316 into the fuel tank 17, in which the entrained inerting agent 316 gas will release into the ullage thereof. The inerting agent 314 does not contain oxygen and fills the ullage of the aircraft fuel tank 17, and will displace oxygen, such that the mixture of the fuel vapor and the inerting agent 314 within the ullage of tank 17 will be non-combustible. The outgassing condition will safely vent as gas 366 through existing fuel tank venting 364 and provide an explosion-safe condition for up to three hours. Aircraft are at most risk during refueling, taxi, takeoff and climb out, which is typically within this three hour time period.

In other embodiments, the inerting agent 314 may be injected directly into the fuel prior to loading operations, and then the fuel 302 may be maintained under pressure until loading, such that the inerting agent 314 will not substantially outgas from within the fuel 302 while being storage in a ground based tank prior to being loaded onto the aircraft 13. This inerting process may also be used in combination with other processes or equipment for refrigerating fuel for aircraft to extend the range of aircraft, and in combination with processes and equipment for providing hot fuels for aircraft to de-ice aircraft. Additionally, the inerting material may be added by a thermally neutral process, such that the temperature of the fuel is either not substantially changed by the inerting process, or later processing returns the temperature of the fuel to temperatures which are substantially equivalent to the initial temperatures of the fuel prior to processing to add the inerting material. The cold fuel provides additional safety against the buildup of explosive vapors during the cruise legs of flights since the cold fuel emits fewer vapors into the ullages at the lower temperatures, which reduces the vapor pressure of the fuel vapors in the ullage. The nitrogen (N2) is injected into the fuel in a gaseous form. When liquefied nitrogen is used as an inerting material, it is first expanded to gaseous form prior to injection into the fuel to prevent freezing of the fuel. Inerting units 312 may be installed on existing aircraft refueling trucks. Fuel tank ullages may be purged with inert material 316 being loaded into the aircraft fuel storage 17 through the fuel hose an into an aircraft fuel loading port, even if no fuel is loaded aboard the aircraft.

A significant reduction in the volume of liquid fuels can be obtained by drastically reducing the temperature of the fuel below ambient temperatures. This has particular application in the field of aviation where fuel storage space is limited. By reducing the volume of the fuel prior to fueling, a greater mass of fuel can be stored for use on the aircraft. This increases the flight time of the aircraft, allowing it greater flight endurance.

The change in volume of kerosene or jet fuel can be approximated for every degree change in temperate by the following formula:

$$V_f = V_i - [V_i (0.0006/° \text{ F.}) (T_i - T_f)]$$

where $V_f$ is the final volume, $V_i$ is the initial volume, $T_i$ is the initial temperature, and $T_f$ is the final temperature. Thus, one thousand gallons of jet fuel at 60° F. that is cooled to –15° F. will have a final volume of about 955 gal. This becomes especially significant on commercial aircraft where large amounts of fuel are stored and consumed. For instance, a typical "BOEING 747" may hold about 53,000 gallons of fuel. By reducing the temperature of the same volume of fuel from 60° F. to –40° F., a 100° F. temperature differential, this volume is reduced by about 3,180 gallons. This equates to over 20,000 pounds of fuel that can be added to the plane's fuel tanks. In other applications, cooling the temperature of the fuel beneath ambient temperatures by a temperature differential of 40° F. may be adequate to provide enhanced fuel capacity and to increase the energy level per unit volume of the fuel, such as cooling the fuel from ambient temperatures of 60° F. to a reduced temperature of 20° F. Additionally, in still other applications, it may be desirable to reduce the temperature of the fuel beneath ambient temperatures, yet maintain the fuel temperatures above 32° F. such that the freezing point of moisture in the ambient air will avoided. Another benefit is that at fuel temperatures of 40° F., the vapor pressure of the fuel in the ullage will be reduced, such that the mixture of fuel and oxygen in the ullage should remain non-combustible at the altitudes at which turbine aircraft fly.

Figure 4:
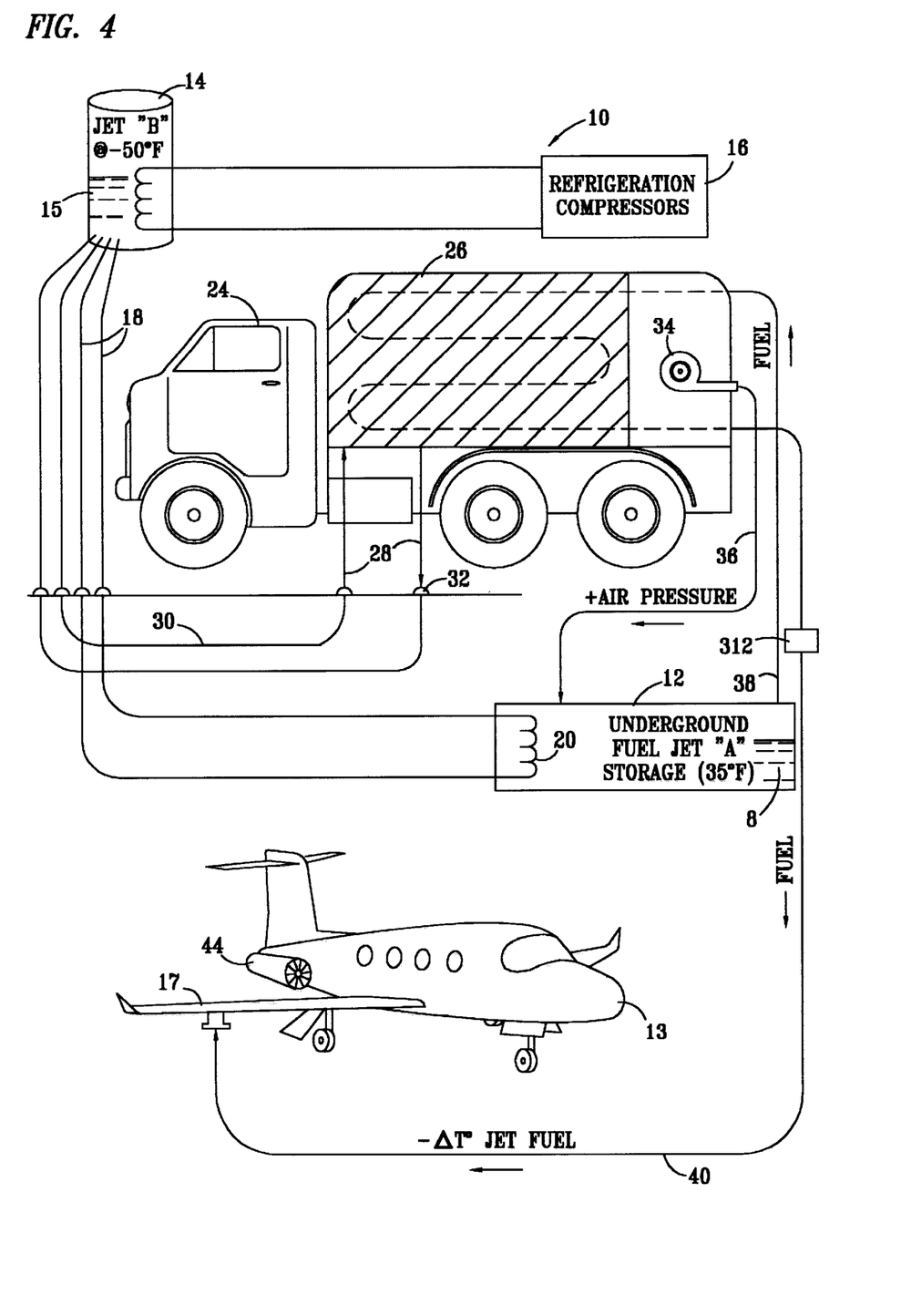
FIG. 4 is a schematic representation of an aircraft being fueled.

Referring to FIG. 4, a fuel cooling system 10 is depicted for refrigeration of jet fuel 8 at a conventional airport facility. Typically, fuel is stored in underground tanks. In this particular case, Jet "A" grade fuel 8 is stored in an underground tank 12. Jet "A" fuel 8 is a warm-weather jet fuel that ceases to flow readily at temperatures below approximately –48° F. This is commonly referred to as the "pour point." Located at a nearby above-ground position is an insulated fuel storage tank 14. The tank 14 holds Jet "B" grade fuel 15. Jet "B" fuel 15 is a cold-weather fuel having a pour point of –58° F. Fuel stored in the tank 14 is coupled to a refrigeration unit 16 that cools that the Jet "B" fuel within the insulated tank 14 to a temperature of about –50° F., which is above the pour point of the fuel. Insulated fuel lines 18 are coupled between the tank 14 and a heat exchange unit 20 which is located in an underground tank 12. By circulating the refrigerated Jet "B" fuel through the heat exchanger 20, the fuel stored in the tank 12 can be prechilled. The temperature of the fuel within the tank 12 should be monitored and the amount of cooling fuel circulated from the tank 14 should be controlled to prevent the temperature of the fuel within the tank 12 from dropping below 32° F. This is to prevent freezing of any existing water that might otherwise damage the tank or fittings. Preferably, the temperature of the fuel within the tank 12 is kept at 35° F.

When it is necessary to fuel an aircraft, such as aircraft 22, a mobile hydrant unit or a truck 24 carrying a heat exchanger 26 is positioned near the aircraft 22 and the underground tank 12, just as a conventional hydrant truck would be during fueling. Although various types of heat exchangers may be used for the heat exchanger 26, a plate-type heat exchanger has been found to be effective. The heat exchanger 26 is connected via hoses 28 to insulated underground pipelines 30 at connections 32. The pipelines 30 feed and return the Jet "B" fuel from the tank 14 as it is circulated through the heat exchanger 26, where it acts as a coolant. As this is done, pressurized air from a compressor 34 is introduced into the underground tank 12 through a line 36. This forces the prechilled Jet "A" fuel through a line 38 which passes through an inerting unit 312 and then into the heat exchanger 26, which is mounted on the truck 24, where the fuel is cooled even further. The inerting unit 312 injects an inerting agent 316 (shown in FIG. 1) into the Het "A" fuel passing through the flow line 38. The temperature of the refrigerated or chilled Jet "A" fuel may vary as it exits the heat exchanger 26. Preferably, the colder the fuel the better, provided the temperature of the fuel is maintained above the pour point of the fuel. Temperatures anywhere between 0 to –50° F. may be reached, with between –15 to –50° F. being preferred. In the particular example described, the Jet "A" fuel may be cooled to approximately –40° F., which is above the pour point of the fuel. The inerted, cooled Jet "A" fuel is passed from the heat exchanger 26, through a fuel hose 40 and to the fuel tank 42 of the aircraft 22. The inert, chilled Jet "A" fuel is then supplied to the engines 44 of the aircraft 22 as would normal temperature fuel. Increases in volume of the fuel due to warming usually are more than compensated for by the volume consumed during flight. The temperature of the fuel may rise only a few degrees per hour, but this is dependent upon ambient conditions. Because the cold-weather Jet "B" fuel is used as the coolant, leaks in either the heat exchanger 20 or the heat exchanger 26 do not present a major concern, as would exist if a non-jet-fuel coolant were used. Although the system of FIG. 1 utilizes a second refrigerated fuel as the coolant, liquid nitrogen may also be used to quickly reduce the temperature of elevated or ambient temperature, inert fuels to sub-zero temperatures.

Figure 5:
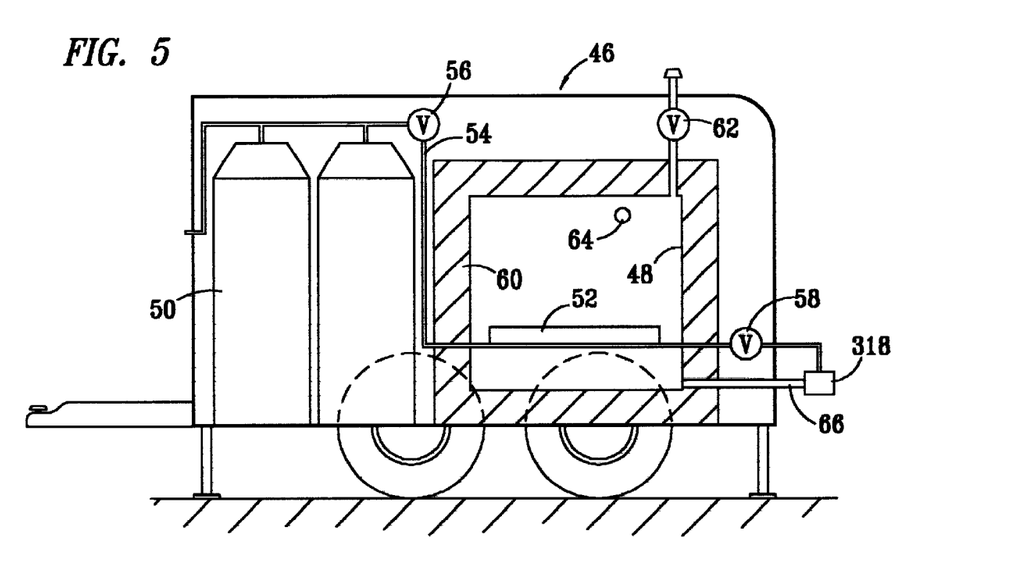
FIG. 5 is a mobile refrigeration unit used in cooling fuel.

FIG. 5 depicts a device 46 in which liquid nitrogen is used for cooling fuel, and then is injected into the fuel to inert the fuel. The device 46 is shown as a trailer, so that it may be moved to desired locations if needed, however, it may be stationary as well. The device 46 may be provided with a pump or compressor (not shown), such as the compressor 34 of FIG. 4, to deliver fuel to an aluminum fuel tank 48 of the device 46. Liquid nitrogen is stored in Dewar tanks or vessels 50. The number and size of tanks will depend on the quantity of fuel being cooled. It has been found that 5,000 gallons of liquid nitrogen is adequate to reduce the temperature of 16,000 gallons of jet fuel by 100° F. A cryogenic heat exchanger 52 is disposed within a tank 48. Materials of the heat exchanger 52 are preferably non-ferrous materials, such as aluminum or brass. Stainless steel may also be used, however, ferrous materials tend to become brittle at extremely low temperatures. The heat exchanger 52 is connected to the nitrogen tanks 50 by an insulated liquid nitrogen supply line 54. A control valve 56 regulates introduction of nitrogen into the heat exchanger 52. Temperature probes and suitable controls (not shown) should be provided to ensure that the fuel is cooled and maintained at the desired temperature. A control valve 58 controls the flow of nitrogen into the mixing unit 318, after the nitrogen is expanded from a liquid to a gas to cool the fuel in the heat exchanger 52. The control valve is preferably operated as an expansion valve, to assure that the nitrogen is expanded to a gaseous state prior to being injected into the fuel passing through the flow line 66. The mixing unit 318 is preferably operated by the controller 320 (shown in FIG. 1) to inject the nitrogen into the fuel. Insulation 60, such as EPS foam, or a vacuum chamber, surrounds the fuel tank 48. A pressure relief valve 62 is provided with the tank 48 to vent fuel vapors to the atmosphere if necessary. An inlet 64 of the tank 48 allows ambient temperature fuel to be cooled to flow into the tank 48. Cold, nitrogenated fuel is withdrawn from the tank 48 through an outlet 66. A suitable delivery hose, a pump, a nozzle, a filter and metering equipment (not shown) may be provided with the tank 48 and coupled to the outlet 66. Other inert gases which are expansible from a liquid to a gaseous phase may be used for the inerting agent and to coll the fuel in other embodiments.

To use the device 46 of FIG. 5, ambient or warm temperature fuel is pumped into the tank 48 through the inlet 64. As the tank 48 is filled, the control valve 56 is opened to allow liquid nitrogen to flow from the tanks 50 to the heat exchanger 52 so that the fuel within the tank 48 is cooled. Nitrogen gas exits the heat exchanger 52 and then passes through the valve 58, in which any liquid nitrogen is expanded to a gaseous state and then passes through the mixing unit 318. The mixing unit 318 injects the gaseous nitrogen into the fuel passing through the outlet 66 to inert the fuel. As the fuel is cooled to the desired temperature, it is withdrawn from the tank 48 through the outlet 66, is injected with the nitrogen, and then is supplied to the fuel storage tank(s) of the vehicle or aircraft being fueled. It should be apparent that the fuel cooled by means of the device 46 may be cooled as a batch or may be fed continuously through the tank 48 so that a continuous stream of cooled fuel is supplied. Appropriate controls should be provided to ensure that the fuel exiting the tank 48 is maintained at the desired temperature.

Figure 6:
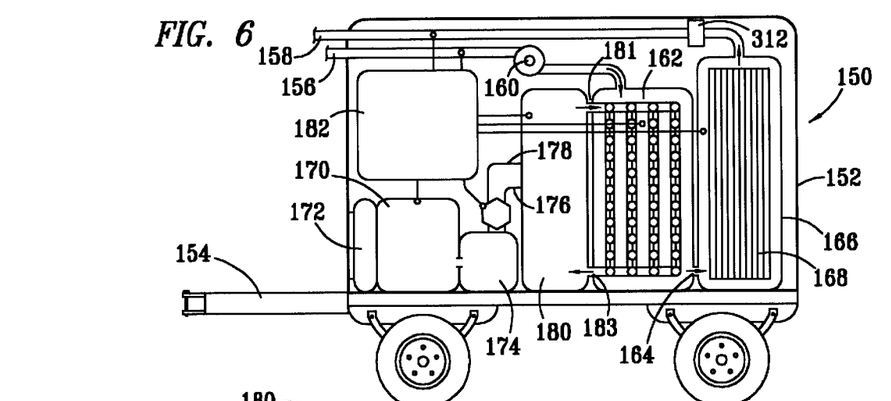
FIG. 6 is a side elevational view of a portable refrigeration unit.
Figure 9:
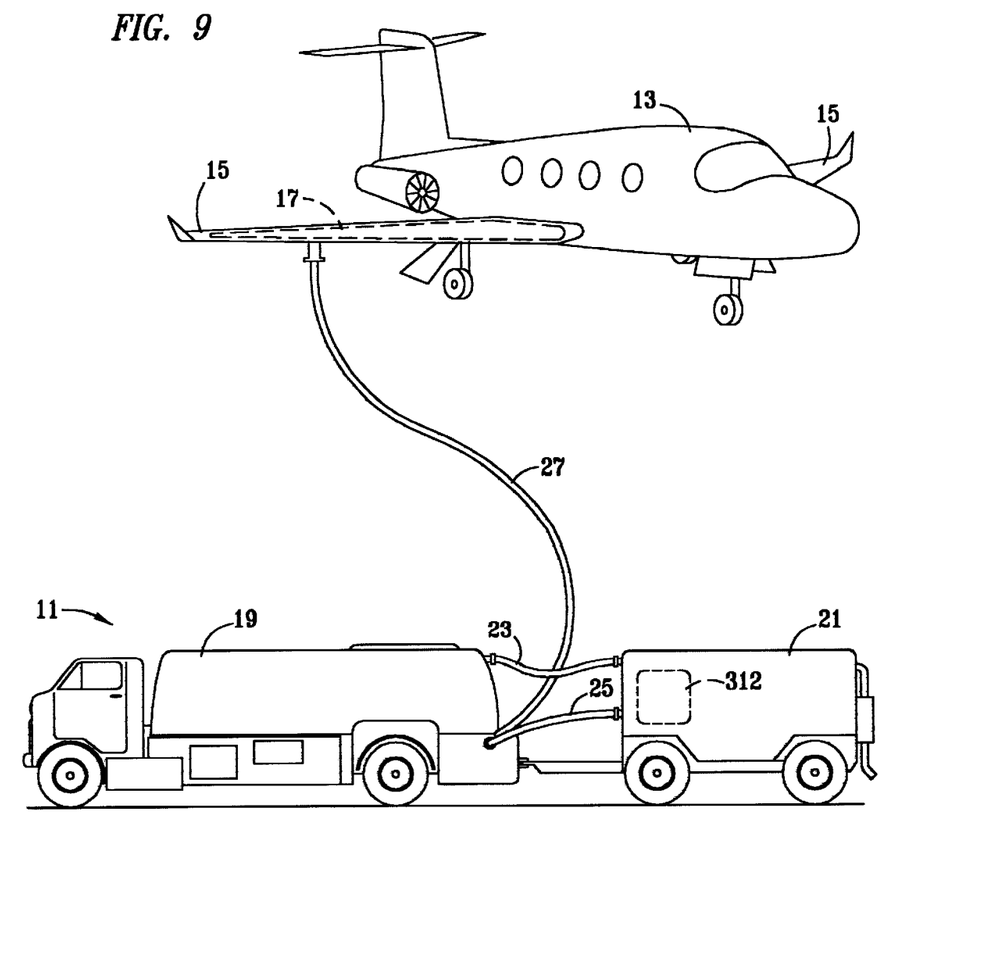
FIG. 9 is perspective view of a hot fuel delivery system for de-icing aircraft.

FIG. 6 is a side elevational view of a portable refrigeration and inerting unit ("PRIU") 150, which is a self contained fuel cooling and inerting unit. As depicted in FIG. 9, the PRIU 150 is trailer mounted. The PRIU 150 includes an explosion-proof cabinet 152 which is mounted to a trailer chassis 154. A fuel inlet 156 and a fuel outlet 158 are provided for passing fuel into and then from the PRIU 150. A fuel pump 160 is provided on the inlet fuel line 156. In some embodiments, the pump on the conventional fuel supply may provide sufficient pressure for flowing the fuel through the PRIU 150, such that the fuel pump 160 is only required in high flow conditions. The PRIU 150 further includes a heat exchanger 162 to which the fuel inlet 156 is connected. A flow path 164 connects the heat exchanger 162 in fluid communication with a water separation unit 166, which preferably is of the type having a coalescing filter 168. In other embodiments, other types of water separators may provide the water separator unit 166 of the PRIU 150, such as gravity type separators and various other types. In the preferred water separation unit 166, an absorption media 168 is provided which swells upon contact with moisture. When excessive moisture is absorbed by the absorption media 168, the PRIU 150 will require servicing. The fuel than passes into an inerting unit 312, which is preferably trailer mounted with the PRIU 150, for injecting the inerting agent 316 (shown in FIG. 1) into the flue passing to the fuel outlet 150. A power unit 170 provides the motive power for operation of the PRIU 150. The power unit 170 is a preferably a self-contained industrial diesel engine, which is configured to operate on the jet fuel being chilled by the PRIU 150. A radiator 172 is provided for cooling a liquid coolant used within the power unit 170. The radiator 172 is of the type used with conventional diesel engines. The power unit 170 drives a hydraulic drive pump 174. The hydraulic drive pump 174 is connected by hydraulic lines 176 and 178 to a low temperature chiller 180. The hydraulic pump 174 moves hydraulic fluid through the hydraulic lines 176 and 178 to drive compressors included in the low temperature chiller 180. An electronic control unit 182 monitors and controls operation of the various components of the PRIU 150. The electronic control unit 182 preferably includes a programmable controller, such as a microprocessor of the type used conventional personal computers and process controllers. The chiller 180 is connected to heat exchanger 162 by flow paths 181 and 183.

Figure 7:
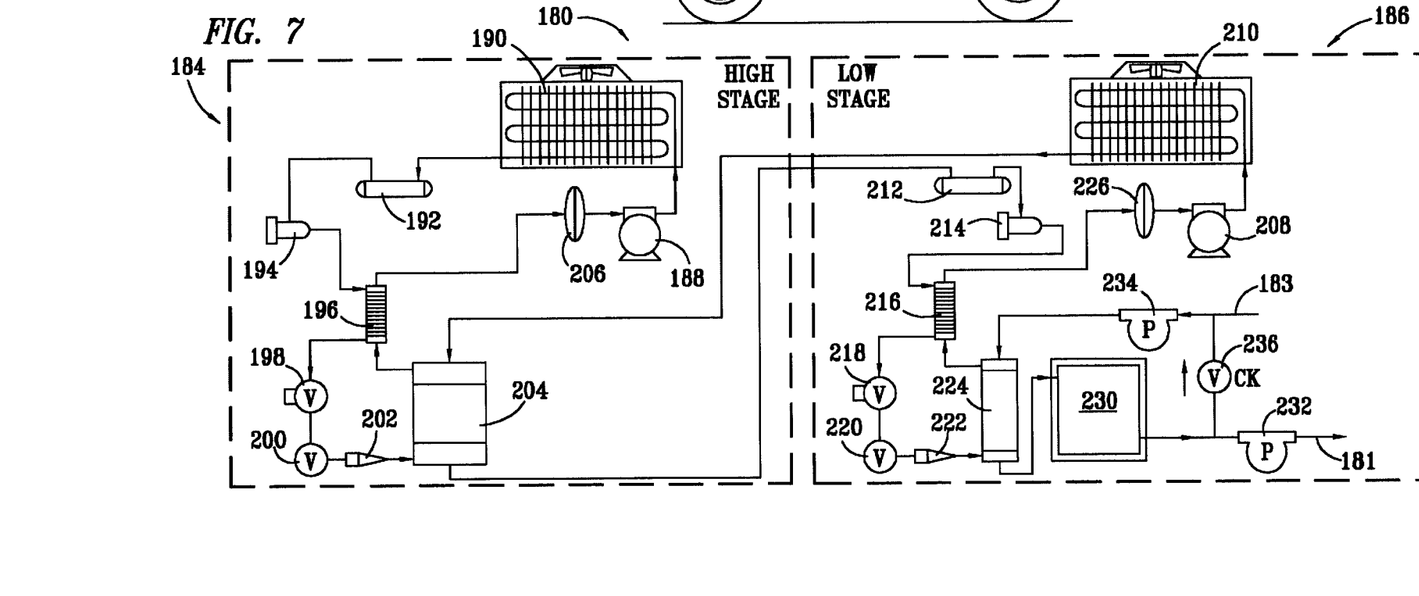
FIG. 7 is a schematic diagram depicting a two-stage, low temperature chiller for providing jet fuel at low temperatures.

FIG. 7 is a schematic diagram of a two-stage chiller which is preferably utilized to provide the low temperature chiller 180 of the PRIU 150. The chiller 180 includes a high stage 184 and a low stage 186. The high stage 184 includes a compressor 188, which is preferably a screw type compressor that is hydraulically driven by the power unit 170 and the hydraulic drive pump 174. The compressor 188 causes the refrigerant to flow within the high stage section 184. The refrigerant passes from the compressor 188 to a condenser 190. The condenser 190 is air cooled, with a fan forcing the air to pass through the condenser 190. Ambient air provides a heat sink. The refrigerant passes through the condenser 190, through a receiver 192 and then through a filter/dryer unit 194. The refrigerant then passes from the filter/dryer unit 194 and through a first side of a liquid/suction interchanger 196. A solenoid valve 198 controls the flow of the refrigerant through the high stage 184. The refrigerant will then flow through the thermal expansion valve 200, through a distributor 202 and to an evaporator/condenser 204. The high stage refrigerant passes through the evaporator side of the evaporator/condenser 204, through a second side of the liquid/suction interchanger 196 and to a suction filter 206 on the inlet of the hydraulically powered compressor 188. The low stage 186 includes a hydraulically powered compressor 208, which is preferably a screw type compressor. The discharge of the compressor 206 is connected to an air cooled desuperheater 210, which is preferably cooled by fan forced air, such that ambient air provides a heat sink. Refrigerant then passes from the air cooled desuperheater 210 and through the low stage side of the evaporator/condenser 204 for transferring heat from the low stage refrigerant to the high stage refrigerant. The low stage refrigerant then passes through a receiver 212 and a filter dryer 214, and through a liquid/suction interchanger 216. A solenoid valve 218 is located after the liquid/suction interchanger 216 for controlling the flow of the refrigerant through the low stage 186. The low stage refrigerant then passes through a thermal expansion valve 220, a distributor 222 and a first side of an evaporator 224. The refrigerant passes from the evaporator 224, back through the liquid/suction interchanger 216 and then through a suction filter 226. The low side refrigerant then passes from the suction filter 226 and into the inlet of the compressor 208. A cooling fluid preferably passes through a second side of the evaporator 224. In other embodiments, the fuel may be directly cooled in the evaporator 224. Heat is transferred from the cooling fluid to the second stage refrigerant passing through the second stage 186. The cooling fluid, after passing through the evaporator 224, passes into a storage reservoir 230. A pump 232 is connected to the outlet of the storage reservoir 230. A bypass check valve 236 is connected to the line extending between the storage reservoir 230 and the pump 232. The check valve 236 will pass the cooling fluid to the bypass pump 234 in response to the bypass pump 234 being actuated to circulate the cooling fluid therethrough. The check valve 236 will pass the cooling fluid from the discharge of the storage reservoir 230, to the inlet of the bypass pump 234, and then to the cooling fluid inlet of the evaporator 224.

Figure 11:
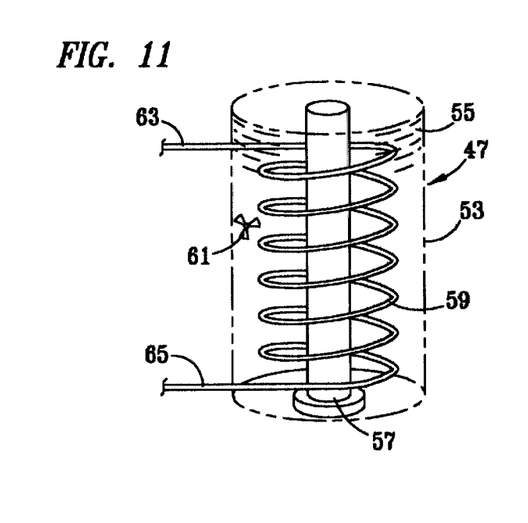
FIG. 11 is a schematic diagram of a thermal transfer means for heating fuel.

The PRIU 150 may be towed behind a conventional vehicle, or the refrigeration components thereof may be mounted to the chassis of a conventional re-fueling truck, as shown in FIG. 11. When the PRIU 150 is used in conjunction with a conventional fuel truck, the PRIU 150 will take advantage of the truck's onboard pumps, filters and water separation unit, which are typically mounted on such fuel trucks. After lowering the temperature and injecting an inerting agent, the fuel is super-filtered and super-water separated, then brought back to the truck where it is again filtered and separated and immediately prior to delivery of the aircraft.

Preferably, the low temperature chiller 180 of the PRIU 150 is operated using a conventional refrigerant rather than liquid nitrogen. The refrigerant is preferably HFC-507/R-23. Other types of refrigerant may be utilized such as SYLTHERM XLT liquid or d-LIMONENE. The PRIU 150 is sized for processing from 100 to 800 gallons per minute of liquid jet fuel, grades A and B. The physical size of the PRIU 150 is 18 feet long, by 8 feet wide, by 8 feet high. The weight is approximately 10,500 pounds. The power unit 170 is rated to 160 horsepower. The estimated BTU load of the PRIU 150 at 100 gallons per minute is estimated to be 1,924,230 BTUs per hour. The PRIU 150 is microprocessor controlled, and includes the initiation of a fail safe shut down should operating condition sensors indicate a malfunction or unsafe circumstances. The PRIU 150 will automatically shut down at a fuel pressure of 65 PSI. The fail safe automatic shut down temperature is –55° F. for the refrigerants, and –33° F. for the process liquids. Kerosene of a specific heat of 0.50 and specific gravity of 0.777 is utilized for the cooling fluid, which transfers heat between the low temperature chiller 180 and the heat exchanger 162. The refrigerant transfer fluid outlet temperature is preferably –40° F. Design pressures are 50 PSI, at design refrigerant flow rates of 200 gallons per minute. The normal operating ambient temperature range of the unit is from 32° F. to 105° F.

It should be noted, that in other embodiments, the PRIU 150 may be used to cool and inert the fuel within an onboard fuel tank of a vehicle, such as the tank 70 of FIG. 3. Two options are possible. One option is to circulate fuel from the tank 70 through the PRIU 150, connecting the inlet 156 and the outlet 158 of the PRIU 150 to the tank 70. A second option is to pass an intermediate cooling fluid between the PRIU 150 and the heat exchanger 74 of the tank 70. Refrigerant from the chiller 180 may also be circulated directly through the cryogenic heat exchanger 74, or an intermediate cooling fluid may be circulated from the outlet 158, through heat exchanger 74, and then back through the inlet 156 to the PRIU 150. In other embodiments, a refrigeration unit similar to the PRIU 150 described above may be skid mounted or permanently mounted at an aircraft facility.

Figure 8:
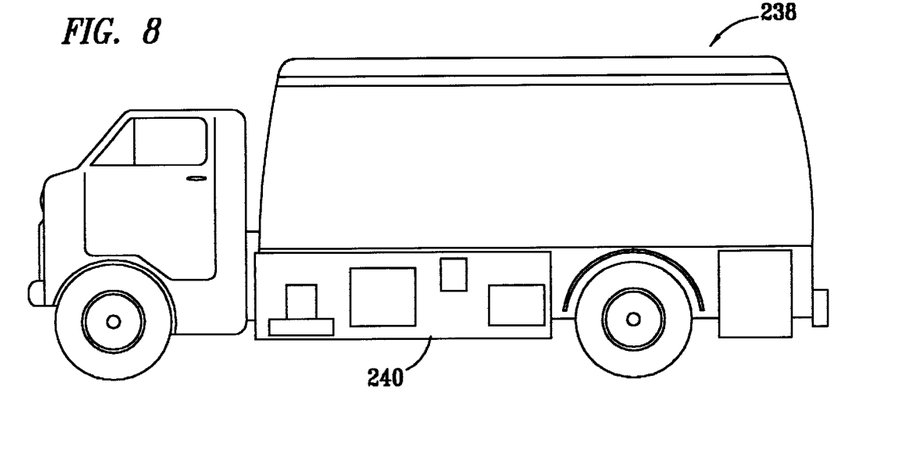
FIG. 8 is a side elevational view of an aircraft refueller truck which includes a portable refrigeration unit.

FIG. 8 is a side elevational view of an aircraft refueller truck 238 which includes a portable refrigeration and inerting unit 240, which is mounted to the chassis of the truck 238. The refrigeration unit 240 includes the processing components of the PRIU 150 for cooling and inerting fuel, except that they are mounted to the chassis of the truck 238 rather than a trailer.

Expendable refrigerants other than liquid nitrogen may be used for cooling fuel. Expendable refrigerants may be provided by liquid nitrogen, carbon dioxide, argon or liquid helium. Such expendable refrigerants, which are also inert, can be utilized in the above described embodiments in place of liquid nitrogen.

The refrigerated fuel has a much smaller density so that more fuel may be stored within fuel tanks. This is particularly advantageous for large commercial jet aircraft, which require great amounts of fuel. There is also particular application with vehicles having reciprocating-type engines. Refrigerated fuel ultimately increases engine efficiencies, performance and reduces exhaust emissions. Modem automotive technology senses the presence of refrigerated fuel and systematically converts its extra-energy resulting from its increased density into improved engine performance, such as increased fuel mileage and/or reduced exhaust emissions through more lean fuel/air mixtures. Aircraft reciprocating engine technology does not use modern computer electronic monitoring devices to monitor levels of unburned fuel residue in exhausts. Refrigerated fuel offers aircraft significant advantage. Aircraft benefit through more-lean or more-rich fuel/air mixtures as accomplished by the pilot in flight through manual adjustment. Extra energy becomes available through a more-dense refrigerated fuel. In a refrigerated state, the fuel itself contains additional energy per measurement and therefore offers more available engine power at take-off and in cruise flight through more rich-mixtures or the engine can be manually leaned-back, providing a more-lean and efficient fuel burn, increased economy, extended range and reduced emissions.

FIG. 9 is perspective view illustrating an hot fuel delivery system 11 for de-icing an aircraft 13, which preferably is of the type of aircraft having wings 15 within which are disposed fuel storage 17 provided by tanks which extend into each of the wings 15. The hot fuel delivery system 11 includes a tank truck 19 and a mobile unit 21. The tank truck 19 preferably has an insulated fuel storage tank. The mobile unit 21 is a diesel powered heating unit and an inerting unit 312, which preferably used nitrogen. Flow lines 23 and 25 connect between the tank truck 19 and the mobile unit 21 for circulating fluid between the mobile unit 21 and the tank truck 19 to heat the fuel within the tank truck 19 and then inert the fuel with the inerting unit 312, preferably by nitrogenating the fuel. A fueling flow line 27 extends from the tank truck 19 to the aircraft 13 for fueling the aircraft 13 with the inerted, hot fuel from delivery system 11.

Figure 10:
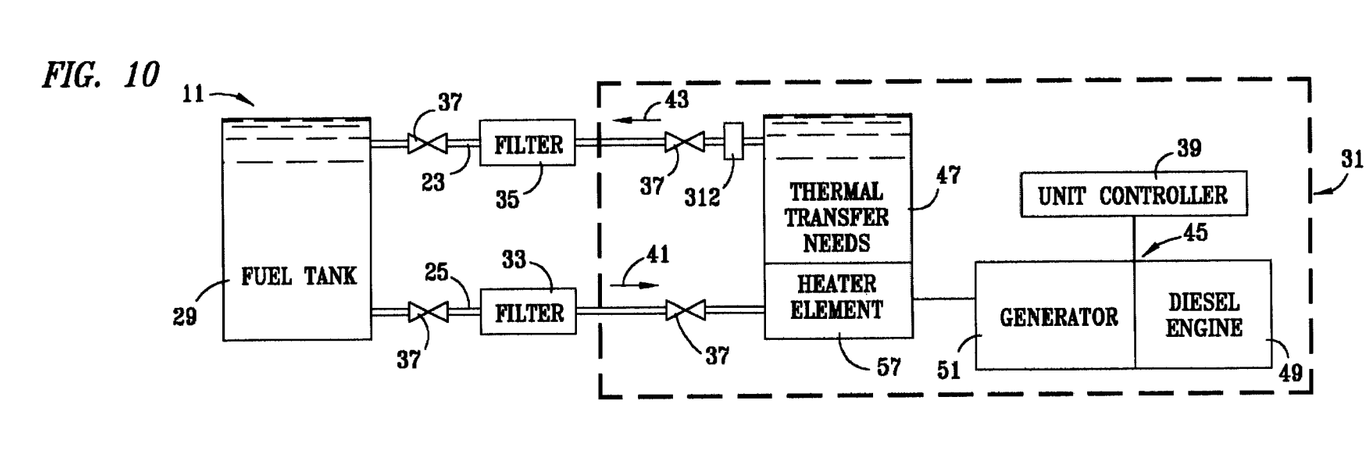
FIG. 10 is a schematic diagram of a hot fuel delivery system.

FIG. 10 is a schematic diagram depicting the hot fuel delivery system 11. A fuel tank 29 is preferably insulated and is connected to a heater unit 31 by the flow lines 23 and 25. The heater unit includes an inerting unit 312 for injecting an inerting agent 316 (shown in FIG. 1) into the fuel. A pump 33 is disposed within the flow line 25 for circulating fluids between the tank 29 and the unit 31. The heating unit 31 is of the type which may be included within the mobile unit 21. A filter 35 is provided in the flow line 23 for filtering the fluids circulating between the heater unit 31 and the fuel tank 29. Fuel valves 37 are provided in the flow lines 23 and 25. The pump 31 and the valves 37 are controlled by a unit controller 39. In this particular embodiment, fluid is circulated in a direction 41 in the flow line 25 and in a direction 43 in the flow line 23. It should be noted that fluid may be circulated in other directions in other embodiments. Further, in various embodiments, the fluid transferred through the flow lines 23 and 25 may be either the fuel being heated, or an intermediate thermal transfer medium such as a thermal transfer liquid. A primary power unit 45 is connected to a thermal transfer means 47, which are both included within the heater unit 31. Preferably, the primary power unit 45 includes a diesel engine 49 and an electric generator 51. The diesel engine 49 and the generator 51 provide electricity for powering a heater element 57 in the thermal transfer means 47. It should be noted that as used herein, a primary power source includes those which generate heat by burning fossil fuels, those which generate heat from an electrical power source, and those which generate heat by other means.

FIG. 11 depicts a schematic diagram of an embodiment for the thermal transfer means 47 (shown in FIG. 10). The thermal transfer means 47 includes a storage tank 53, within which a secondary thermal fluid 55 is interiorly disposed. The storage tank 53 is preferably insulated. The secondary thermal fluid 55 is preferably a thermal oil. A heater element 57 and a heat exchanger 59 are disposed within the storage tank 52, immersed within the thermal fluid 55. The heat exchanger 59 is wrapped exteriorly around the heater element 57. A circulation unit 61 is provided for circulating the secondary thermal fluid 55 within the storage tank 53 for uniformly distributing the heat therein. Fuel connections 63, 65 are provided by the tubing from which the heat exchanger 59 is formed. Preferably, fuel is transferred through the flow connection 65, through the heat exchanger 59, and exits from within the storage tank 53 through the flow connection 63. Heat is stored within the secondary thermal fluid 55 by continuously operating the heater element 57 to the heat thermal fluid 55 up to high temperatures, such as above 200 degrees Fahrenheit. Typically, the temperature of the thermal fluid 55 will be continuously maintained at the high temperatures. Then when fuel is demanded, the fuel is circulated through the thermal transfer means 47 and heat is transferred to the fuel by virtue of a temperature difference between the fuel and the thermal fluid 55. The secondary thermal fluid provides a thermal capacity so that the primary power heating units may be rated at lower, less costly and less expensive to operate sizes over what would be required to heat the fuel from ambient temperatures upon demand.

Referring to FIG. 9, in operation, fuel will be loaded into tank truck 1 at ambient temperatures, such as those commonly encountered on the ground. Such ambient temperatures are inclusive of temperatures encountered with both in-ground and above-ground types of storage tanks. The mobile unit 21 is typically continuously operated to elevate the temperature of the thermal fluid 55 to high temperatures, such as two-hundred degrees Fahrenheit. The fuel within the tank truck 19 is circulated through the flow line 25 and into the mobile unit 21, and then back through the flow line 23 and into the tank truck 19. Circulation is continued until the fuel within the tank truck 19 is heated to the elevated temperatures, such as 130 degrees Fahrenheit. Fuel is then transferred through the flow line 27 into the tank 17 of the aircraft 13. The temperature of the hot fuel within the tank 17 will be elevated above the temperatures of the surface, or outer periphery of the wings 15. By virtue of this temperature difference, heat will transfer from the tank 17 to the exterior of the wing 15, melting any frozen moisture which is accumulated upon the wing 15. It should be noted that the liquid fuel has the capacity to contain large amounts of heat. It is expected that hot fuel having temperatures not substantially less than 130 degrees Fahrenheit should be sufficiently hot enough to maintain the wings 15 in a de-iced condition for several hours during blizzard conditions.

Referring to FIGS. 9 through 11, fuel is transferred from the tank 29, through the flow line 25 and into the storage tank 53. The fuel then passes through the heat exchanger 59 and absorbs heat from the secondary thermal fluid 55. The fuel is circulated through the heat exchanger 59 and absorbs heat from the secondary thermal fluid 55 until the fuel is heated to an elevated temperature of not substantially less than 130 degrees Fahrenheit. The fuel also passes through the inerting unit 312, to inject the inerting agent (shown in FIG. 1) to inert the fuel. The hot fuel is then transferred into the storage 17 on the aircraft 12. The hot fuel will then the heat wings 15 to prevent moisture condensation and freezing, and the inerting agent 316 (shown in FIG. 1) will outgas into the ullage of the storage 17 for up to three hours. In other embodiments, the fueling flow line 27 and the flow line 23 may be directly connected for heating the fuel in a single pass through the mobile unit 21, and inerting the fuel in the single pass. The inert loading, hot fuel would then flow from the tank truck 19, through the flow line 25 and the mobile unit 21, and then directly to the tank 17 of the aircraft 13. This would of course require higher capacity heating units to be within the mobile unit 21. Further, the mobile unit 21 could directly heat the fuel without having an intermediate thermal transfer fluid. Additionally, other embodiments could incorporate, or mount, the components of the mobile unit 21 directly onto a tank truck 19. For example, the inerting unit 312 could be mounted directly to the tank truck 19, for inerting fuel as is transferred from the tank truck 19 into the fuel storage 17.

The mobile unit 21 may also be connected to the aircraft 13 for heating and inerting the fuel within the tank 17. Aircrafts typically have at least two to three fuel tanks which are interconnected so that fuel will transfer between the tanks. Each of the tanks typically has its own fueling port. The flow lines 23, 25 of the mobile unit 21 could be separately connected to different fueling ports corresponding to two of the different fuel tanks in the aircraft 13 for circulating fuel from within the aircraft 13, through the mobile unit 21 for heating to elevated temperatures and inerting the fuel, and then back into fuel tanks, such as the fuel tank 17, of the aircraft 15. Thus, fuel could be removed from the aircraft 13, passed through the mobile unit 21, and then transferred back into the aircraft 13 to fuel the aircraft with the inerted fuel at the elevated temperatures. The mobile unit 21 is operable for both maintaining the temperature of the hot fuels if the aircraft 13 must remain on the ground for extended periods of time, and for heating fuel within the tank 17 to elevated temperatures, and also for a secondary energizing the fuel with the inerting agent after a period of time has elapsed from an initial inerting of the onboard fuel.

Figure 12:
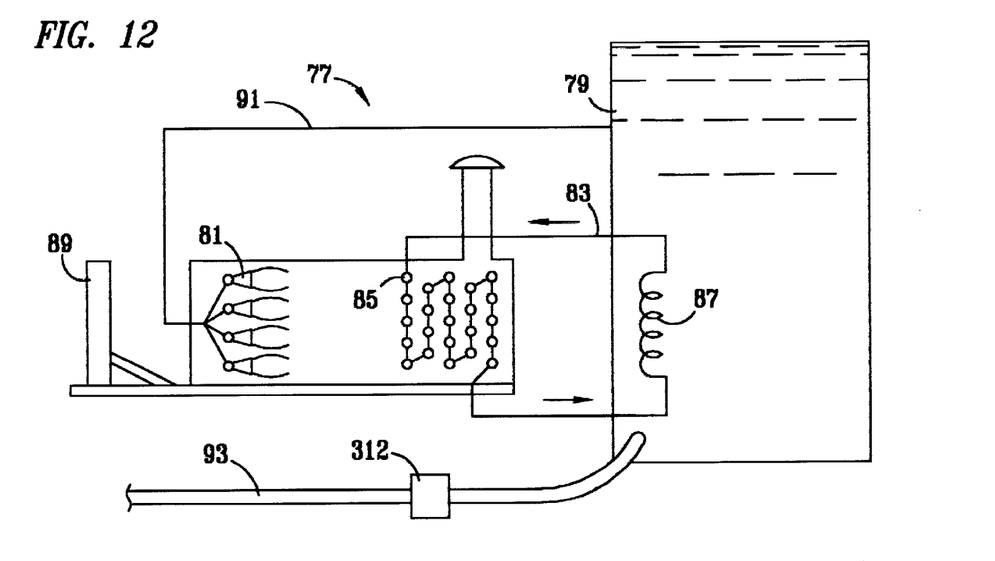
FIG. 12 depicts a large capacity hot fuel delivery system.

FIG. 12 depicts a hot fuel delivery system 77 for accommodating large fuel supply demands, such as that which may be required for busy airports in larger metropolitan areas. The hot fuel delivery system 77 includes a large capacity storage tank 79, such as a tank having a 500,000 gallon capacity. Fuel within the tank 79 is heated to elevated temperatures, such as temperatures which are not substantially less than 130 degrees Fahrenheit. A direct fired furnace 81 provides a primary heat source for heating fluids within a closed loop circulating system 83. The closed loop circulating system 83 includes a heat exchanger 85 and a heat exchanger 87. The heat exchanger 85 is included within the direct fired furnace 81 so that hot gases exiting the direct fired furnace 81 will heat fluids within the heat exchanger 85. The heat exchanger 87 is within the storage tank 79 and receives hot secondary thermal fluids from the heat exchanger 85 for passing therethrough to heat the fuel within the storage tank 79. The thermal fluid exiting the heat exchanger 87 then pass again through the heat exchanger 85 for reheating within the direct fired furnace 81. It should be noted that the closed loop circulator 83 is depicted herein in a simplistic fashion, and some of the common elements that are well known in the art to provide in such circulating systems are omitted. A controller 89 provides a means for controlling the direct fired furnace 81 and the closed loop circulating system 83. The fuel within the tank 79 maybe circulated by a pump, or other type of circulation means, or heat may transfer within the fuel within the tank 79 by combination of conduction and natural liquid convection. A flow line 93 extends from the tank 79 for passing to a refueler truck, such as the tank truck 19 (shown in FIG. 12). Fluids within the tank 79 will preferably be maintained at an elevated temperature, such as 130 degrees Fahrenheit. It is also preferable that the tank 79 and the flow line 93 be insulated to reduce heat losses. A flow line 91 may be provided for using fuel from within the tank 79 to operate the furnace 81. An inerting unit 312 is installed in the flow line 91 to inject an inerting agent 316 (shown in FIG. 1) into the fuel passing through the flow line 91.

Figure 13:
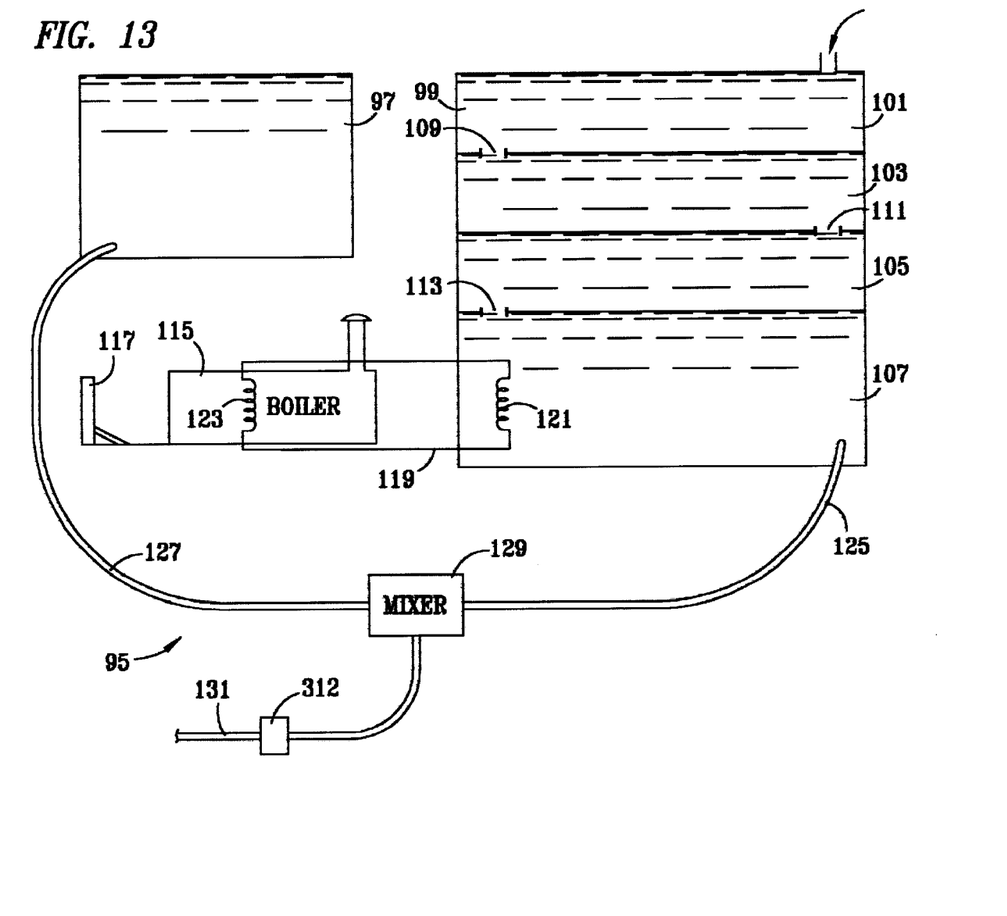
FIG. 13 a second large capacity hot fuel delivery system.

FIG. 13 depicts a hot fuel delivery system 95. The hot fuel delivery system 95 is a large capacity delivery system such as may be used at larger, metropolitan airports where larger demands are encounter. The delivery system 95 includes a primary storage tank 97 and a secondary storage tank 99. The primary storage tank 97 is a large capacity storage tank, such as for containing 500,000 gallons of fuel. The fuel within the primary storage tank 97 may be at ambient temperatures, such as 50 degrees Fahrenheit. The secondary storage tank 99 is a compartmentalized tank, having compartments 101, 103, 105, and 107. Ports 109, 111, and 113 are provided for passing fuel from the compartment 101 to the compartment 103, from the compartment 103 to the compartment 105, and from the compartment 105 to the compartment 107, respectively. A furnace 115 is a direct fired furnace, such as the furnace 81(shown in FIG. 12). A control unit 117 is provided to control operation of the furnace 115. A closed loop circulating system 119 extends from the furnace 115 to a heat exchanger 121 within the compartment 107 of the secondary storage tank 99. The secondary storage tank 99 may be a smaller capacity storage tank, such as one having a capacity of 50,000 gallons. The closed loop circulating system 119 further includes a heat exchanger 123 from which hot gases from the furnace 115 transfer heat to the thermal fluid within the closed loop circulating system 119. Fuel at ambient temperatures will enter into the secondary storage tank 99 in the compartment 101. It should be noted that heat is transferred by the closed loop circulating system 119 only to the fuel within the storage compartment 107. The fuel therein will be heated to higher, elevated temperatures such as three-hundred degrees Fahrenheit. The fuel within the compartments 103 and 105 will be at lesser temperatures than the fuel within the compartment 107, yet at greater temperatures than the fuel within the compartment 101. As fuel is passed from within the compartment 107 to a flow line 125, the fuel from the upper compartments will transfer downward. Thus, each of the four compartments will be operated at different temperatures, with the temperature decreasing in the higher compartments. For example, the compartment 101 could be maintained from minus thirty to fifty degrees Fahrenheit. The temperature in the storage tank 83 could be maintained at one-hundred-thirty-four degrees Fahrenheit. The temperature in the compartment 105 could be maintained at two-hundred and eighteen degrees Fahrenheit. Lastly, the temperature in the compartment 107 could be maintained at three-hundred degrees Fahrenheit. Upon demand for fuel, the fuel initially within the compartment 107 transfers through the flow line 125 and the fuel from the large capacity storage tank 97 transfers through a flow line 127. The flow lines 125 and 127 are connected to a mixer 129 for mixing the cooler fuel from the storage tank 97 with the ultra-hot fuel from compartment 107 of the storage tank 99. The mixer 129 then passes the hot fuel to a fuel line 131 for delivery to an aircraft, or preferably to an insulated tank truck for transport to an aircraft. An example of the various temperatures and mixture ratios used for the hot fuel delivery system 95 could be as follows. Hot fuel at three-hundred degrees Fahrenheit transfers through the flow line 125 to the mixer 129. Cooler fuel, such as at temperatures of fifty degrees Fahrenheit and less, also transfer to the mixer 129. The mixer 129 then mixes the fuels at a 2 to 1 ratio, that is two parts of the cooler fuel from the flow line 127 with one part of the ultra-hot fuel from the flow line 125. The resulting mixture of fuels would then pass through the flow line 131 and have a mixture temperature in the range of one-hundred-thrity degrees Fahrenheit. An inerting unit 312 is connected to the flow line 131 for injecting the inerting agent 316 into the hot fuel passing through the flow line 131. The hot fuel delivery system 95 provides a large capacity delivery system, yet requires heating equipment having a smaller rated heating capacity than would be required for instantaneously heating fuel upon demand. Rather than heating the entire 50,000 gallon tank 97, the smaller compartment 107 within a 50,000 gallon tank 99 is heated, and the temperature of the fluids are stratified within the storage tank 99. By having the upper compartments at higher temperatures than ambient temperatures, they may be more quickly heated upon demand by lower capacity furnaces and heat exchangers than would be required to instantaneously meet the thermal demand for heating hot fuel directly from ambient temperatures to the elevated temperatures. A fuel inerting system may be provided for other systems which do not include a circling system for transferring heat by means of a secondary thermal transfer fluid. That is, fuel may be passed directly through a furnace or heating component. However, such types of systems would have much greater risk that the fuel could be inadvertently ignited.

The hot fuel system may be used with inert fuels to de-ice aircraft on the ground, without requiring modification to the design of current aircraft. The aircraft will still have prior art in flight de-icing systems. Further, the problem of moisture condensation within aircraft components such as fuel tanks are avoided when aircraft are fueled with hot fuel. No airframe changes are required, and after treatment and the fuel still meets API and MIL specifications.

Although the preferred embodiment has been described in detail, it should be understood that various changes, substitutions and alterations can be made therein without departing from the spirit and scope of the invention as defined by the appended claims.

What is claimed is:

1. A method for treating fuel to prevent explosions within aircraft fuel tanks, comprising the steps of:

provided a liquid fuel;

directly injecting a gaseous inerting agent into the fuel;

loading the fuel into a storage tank aboard an aircraft;

wherein the gaseous inerting agent separates from within the fuel in the storage tank and moves into the ullage of the storage tank, substantially rendering the ullage non-combustible;

cooling the fuel to reduced temperatures substantially less than ambient temperature so that the volume of the fuel is reduced; and storing the fuel in the storage tank while the fuel is at the reduced temperatures.

2. The method of claim 1, wherein the fuel is cooled to temperatures not substantially less than 32° F.

3. The method of claim 1, wherein the fuel is cooled to temperatures which are not substantially less than 40° F. below ambient temperatures.

4. The method of claim 1, wherein the fuel is cooled to temperatures between about 0° F. and −50° F.

5. The method of claim 1, wherein the fuel is cooled to a temperature of approximately 40° F.

6. The method of claim 1, wherein the fuel is cooled externally of the aircraft, prior to introducing the fuel into the storage tank.

7. The method of claim 1, wherein the fuel is cooled externally to the aircraft at a ground location to reduced temperatures substantially less than ambient temperature so that the volume of the fuel is reduced; and further comprising the step of:

removing moisture from the fuel.

8. An apparatus for supplying and treating fuel for an aircraft, comprising:

a supply of fuel;

a fuel flow line for transferring said fuel to the aircraft;

a supply of inerting agent which is in gaseous form when stored at pressures and temperatures of the fuel tanks of the aircraft, and which does not contain oxygen in substantial amounts;

an injector for injecting said inerting agent into said fuel within said flow line;

a mixing unit for controlling the supply of said inerting agent to said injector; and a refrigeration unit for cooling said fuel to reduced temperatures which are substantially less than ambient temperature so that the volume of said fuel is reduced.

9. An apparatus for supplying and treating fuel for an aircraft, comprising:

a supply of fuel;

a fuel flow line for transferring said fuel to the aircraft;

a supply of inerting agent which is in gaseous form when stored at pressures and temperatures of the fuel tanks of the aircraft, and which does not contain oxygen in substantial amounts;

an injector for injecting said inerting agent into said fuel within said flow line;

a mixing unit for controlling the supply of said inerting agent to said injector; and a heat exchanger for cooling said fuel, such that temperatures of said fuel are less than ambient temperatures and the cooled volume of said fuel is reduced below the volume of said fuel at atmospheric temperatures; and wherein additional fuel is stored within the volumetric storage capacity of a fuel storage tank of the aircraft, over the weight of fuel storable within the storage tank with fuel of ambient temperatures.

10. The apparatus of claim 9, further comprising:

a chiller for compressing and expanding a refrigerant fluid to transfer heat from said fuel to a heat sink; and a cooling fluid circulation system which circulates a cooling fluid between said chiller and said cryogenic heat exchanger for transferring heat therebetween and increasing the energy value of said fuel per unit volume.

11. A method for treating fuel to prevent explosions within aircraft fuel tanks, comprising the steps of:

providing a liquid fuel;

directly injecting a gaseous inerting agent into the fuel;

loading the fuel into a storage tank aboard an aircraft;

wherein the gaseous inerting agent separates from within the fuel in the storage tank and moves into the ullage of the storage tank, substantially rendering the ullage non-combustible; and passing the gaseous inerting agent through a fuel flow line and into the storage tank of the aircraft, without fuel being loaded aboard the aircraft with the inerting agent.

12. The method of claim 11, further comprising the step of passing the fuel through the fuel flow line and into the storage tank of the aircraft, after the step of passing the inerting agent through the fuel flow line and into the storage tank without fuel being loaded aboard the aircraft without the inerting agent.

13. The method of claim 11, further comprising the step of passing the fuel through the fuel flow line and into the storage tank of the aircraft, after injecting the gaseous inerting agent into the fuel.

* * * * *